(12) United States Patent  
Hulse et al.

(10) Patent No.: US 8,883,707 B2
(45) Date of Patent: Nov. 11, 2014

(54) AZEOTROPE-LIKE COMPOSITION OF $PF_5$ AND HF

(75) Inventors: Ryan J. Hulse, Getzville, NY (US); Rajat S. Basu, East Amherst, NY (US); Matthew H. Luly, Hamburg, NY (US)

(73) Assignee: Honeywell International Inc., Morristown, NJ (US)

( * ) Notice: Subject to any disclaimer, the term of this patent is extended or adjusted under 35 U.S.C. 154(b) by 516 days.

(21) Appl. No.: 13/097,836

(22) Filed: Apr. 29, 2011

(65) Prior Publication Data

US 2012/0003138 A1 Jan. 5, 2012

Related U.S. Application Data

(60) Provisional application No. 61/360,126, filed on Jun. 30, 2010.

(51) Int. Cl.
*C01B 25/10* (2006.01)
*C01D 15/00* (2006.01)
*C01B 7/19* (2006.01)

(52) U.S. Cl.
CPC .............. *C01B 25/10* (2013.01); *C01D 15/005* (2013.01); *C01B 7/191* (2013.01)
USPC .......................................... 510/408; 423/301

(58) Field of Classification Search
None
See application file for complete search history.

(56) References Cited

U.S. PATENT DOCUMENTS

| 2,830,105 | A | * | 4/1958 | Mackor | ......................... 585/840 |
| 3,431,087 | A | * | 3/1969 | Kuhn | ............................ 423/277 |
| 5,100,639 | A | | 3/1992 | Freire et al. | |
| 5,935,541 | A | | 8/1999 | Bonnet et al. | |
| 6,387,340 | B1 | | 5/2002 | Na et al. | |
| 7,648,682 | B2 | * | 1/2010 | McDermott et al. | ........... 422/168 |
| 2002/0001553 | A1 | | 1/2002 | Bulan | |
| 2002/0137645 | A1 | | 9/2002 | Pham et al. | |
| 2003/0009065 | A1 | | 1/2003 | Pham et al. | |
| 2005/0096247 | A1 | | 5/2005 | Luly et al. | |
| 2011/0021803 | A1 | | 1/2011 | Jin et al. | |

FOREIGN PATENT DOCUMENTS

JP   2003-238161 A   8/2003
WO   WO 2007125065 A1 * 11/2007

OTHER PUBLICATIONS

Kim, Min Soo "A Study to Determine the Existence of an Azeotropic R-22 "Drop-In" Substitute" Building Environment Division, Building & Fire Research Laboratory Mar. 1996, pp. 1-45.
Morrison, Graham "Azeotrophy in refrigerant mixtures" Rev. Int. Froid 1993 vol. 16 No. 2 1993, pp. 129-138.

* cited by examiner

*Primary Examiner* — Jafar Parsa
*Assistant Examiner* — Medhanit Bahta
(74) *Attorney, Agent, or Firm* — Carrie Beatus

(57) ABSTRACT

Provided are azeotropic and azeotrope-like compositions of $PF_5$ and HF, and methods of making such compositions. Such azeotropic and azeotrope-like compositions can be used, for example, in processes for producing $LiPF_6$.

6 Claims, 3 Drawing Sheets

AZEOTROPE-LIKE COMPOSITION OF $PF_5$ AND HF

RELATED APPLICATIONS

This application claims the benefit of U.S. Provisional Application Ser. No. 61/360,126, filed on Jun. 30, 2010.

FIELD OF THE INVENTION

The present technology pertains to azeotropic or azeotrope-like compositions of phosphorus pentafluoride ($PF_5$) and hydrogen fluoride (HF). More particularly the invention pertains to such azeotropic and azeotropic-like compositions that are useful intermediates in the production of lithium hexafluorophosphate ($LiPF_6$).

DESCRIPTION OF RELATED ART $LiPF_6$ is a highly conductive salt that is used in lithium ion batteries. A lithium ion battery is made up of an anode which is typically carbon, a cathode made of a metal oxide, a separator and an electrolyte which contains $LiPF_6$. Lithium ion batteries have found use in personal electronics such as cell phones and laptop computers as well as in hybrid electric vehicles. Lithium ion batteries are ideal for these applications due to their high energy density. The higher the energy density, the smaller and lighter the battery for a given application. Lithium ion batteries also operate at higher voltage and have a longer shelf life than other common rechargeable batteries.

Typically, $LiPF_6$ is manufactured by using lithium fluoride (LiF) and phosphorus pentafluoride $PF_5$ as starting materials. One method of producing $LiPF_6$ is disclosed for example, in U.S. Pat. No. 5,935,541 to Bonnet et al., which involves reacting $PF_5$ gas, alone or accompanied by HCl, and a solution of LiF in HF. There are several methods of producing the $PF_5$ that can be used in the production of $LiPF_6$. For example, some conventional methods for preparing $PF_5$ are known in which $PF_5$ is produced along with other reaction products, and must be purified prior to removing those other reaction products. As another example, a method of producing $PF_5$ more directly by reacting elemental phosphorus (P) and fluorine ($F_2$) is described in U.S. patent application Ser. No. 12/722,390, filed on Mar. 11, 2010.

SUMMARY OF THE INVENTION

The present technology provides an azeotropic or azeotrope-like composition comprising, consisting essentially of, or consisting of phosphorus pentafluoride ($PF_5$) and hydrogen fluoride (HF), and methods of producing such a composition. In examples where the composition consists essentially of phosphorus pentafluoride ($PF_5$) and hydrogen fluoride (HF), additional components may be present to the extent that they do not materially affect the azeotropic or azeotrope-like properties of the composition.

In one aspect, an azeotropic or azeotrope-like composition is provided that comprises HF and $PF_5$. In one example, the HF is in an amount from about 0.01 weight percent to about 12 weight percent based on the total weight of the azeotropic or azeotrope-like composition, the $PF_5$ is in an amount from about 88 weight percent to about 99.99 weight percent based on the total weight of the azeotropic or azeotrope-like composition, and the azeotropic or azeotrope-like composition has a boiling point of from about −13° C. to about 0° C. at a pressure of from about 268 psia to about 377 psia.

In another aspect, a method of forming an azeotropic or azeotrope-like composition of HF and $PF_5$ is provided that includes providing HF from a source of HF, providing $PF_5$ from a source of $PF_5$, and combining the HF and the $PF_5$ to form the azeotropic or azeotrope-like composition.

BRIEF DESCRIPTION OF THE DRAWINGS

Specific examples have been chosen for purposes of illustration and description, and are shown in the accompanying drawings, forming a part of the specification.

DETAILED DESCRIPTION

Figure 1:
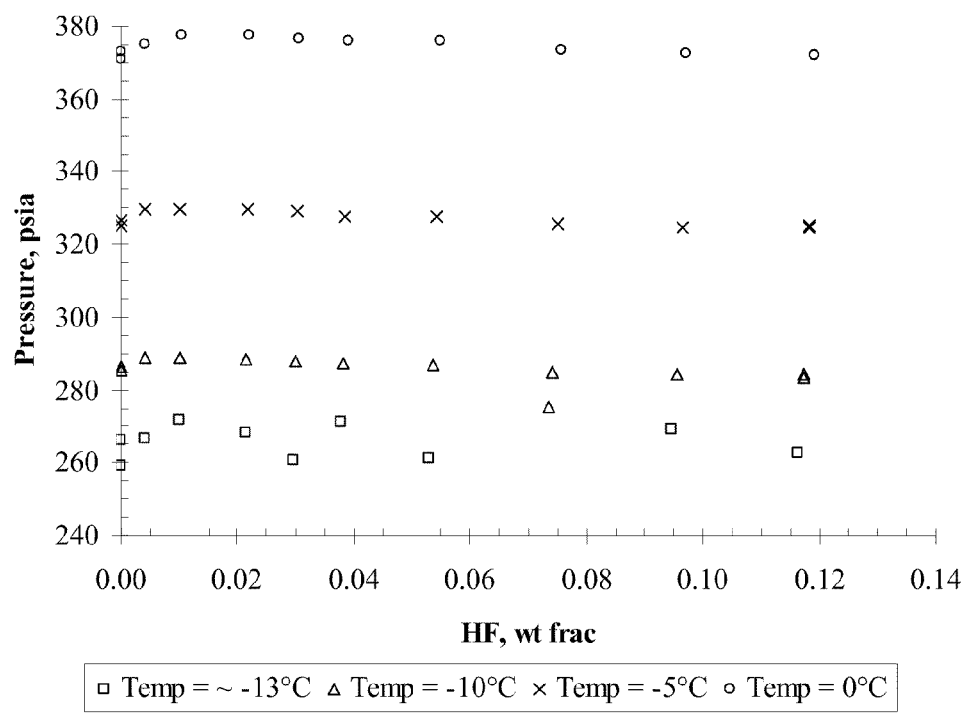
FIG. 1 provides a plot of the vapor pressures of the mixtures formed in Example 1 below, as measured at −13° C., −10° C., −5° C. and 0° C.

The present technology provides an azeotropic or azeotrope-like compositions that comprise, consist essentially of, or consist of, phosphorus pentafluoride ($PF_5$) and hydrogen fluoride (HF), and methods of producing such compositions. For example, one method includes forming an azeotropic or azeotrope-like composition comprising, consisting essentially of, or consisting of HF and $PF_5$ by combining HF and $PF_5$ in amounts effective to form the azeotrope or azeotrope-like composition at a suitable temperature and a suitable pressure.

As used herein, the term "azeotrope-like" is intended in its broad sense to include both compositions that are strictly azeotropic and compositions that behave like azeotropic mixtures. For example, azeotrope-like compositions can be compositions for which the bubble point curve remains relatively constant, dropping by less than about 2%, over the compositional range. From fundamental principles, the thermodynamic state of a fluid is defined by pressure, temperature, liquid composition, and vapor composition. An azeotropic mixture is a system of two or more components in which the liquid composition and vapor composition are equal at the stated pressure and temperature. In practice, this means that the components of an azeotropic mixture are constant boiling and cannot be separated during distillation.

Azeotrope-like compositions are constant boiling or essentially constant boiling. In other words, for azeotrope-like compositions, the composition of the vapor formed during boiling or evaporation (under substantially isobaric conditions) is identical, or substantially identical, to the original liquid composition. Thus, with boiling or evaporation, the liquid composition changes, if at all, only to a minimal or negligible extent. This is to be contrasted with non-azeotrope-like compositions in which, during boiling or evaporation, the liquid composition changes to a substantial degree. All azeotrope-like compositions of the invention within the indicated ranges as well as certain compositions outside these ranges are azeotrope-like.

It is well known that at differing pressures, the composition of a given azeotrope will vary at least slightly, as does the boiling point of the composition. Thus, an azeotrope of A and B represents a unique type of relationship, but with a variable composition depending on temperature and/or pressure. It follows that, for azeotrope-like compositions, there is a range of compositions containing these components in varying proportions that are azeotrope-like. All such compositions are intended to be covered by the term "azeotrope-like" as used herein.

Accordingly, the boiling point of the liquid azeotropic or azeotrope-like composition is fixed and the composition of the vapor above the boiling liquid composition is essentially that of the boiling liquid composition, such that essentially no fractionation of the components of the liquid composition takes place. Both the boiling point and the weight percentages of each component of the azeotropic or azeotrope-like composition may change when the azeotrope or azeotrope-like liquid composition is subjected to boiling at different pressures. Thus, an azeotropic or azeotrope-like composition may be defined in terms of the relationship that exists between its components, in terms of the compositional ranges of the components, or in terms of weight percentages of each component of the composition characterized by a fixed boiling point at a specified pressure.

One method of forming an azeotropic or azeotrope-like composition of HF and $PF_5$ includes providing HF from a source of HF, providing $PF_5$ from a source of $PF_5$, and combining the HF and the $PF_5$ to form the azeotropic or azeotrope-like composition. The HF and the $PF_5$ can be provided in effective amounts from their respective sources. An effective amount each component is an amount that, when combined with the other component(s), results in the formation of an azeotropic or azeotrope-like composition of the components.

Azeotropic or azeotrope-like compositions of the present technology can generally include HF in an amount from about 0.01 weight percent to about 12 weight percent based on the total weight of the azeotropic or azeotrope-like composition, and $PF_5$ in an amount from about 88 weight percent to about 99.99 weight percent based on the total weight of the azeotropic or azeotrope-like composition. In one example, an azeotropic or azeotrope-like composition having a boiling point of about 0° C., where the azeotropic or azeotrope-like composition comprises, consists of, or consists essentially of, HF in an amount of 0.5±0.4 weight percent based on the weight of the azeotropic or azeotrope-like composition and PF5 in an amount of 99.5±0.4 weight percent based on the weight of the azeotropic or azeotrope-like composition.

In some examples, an azeotropic or azeotrope-like composition can include HF in an amount from about 0.01 weight percent to about 12 weight percent, from about 0.01 weight percent to about 5 weight percent based on the total weight of the azeotropic or azeotrope-like composition, or from about 0.1 weight percent to about 1 weight percent based on the total weight of the azeotropic or azeotrope-like composition. Additionally, the azeotropic or azeotrope-like composition can include $PF_5$ in an amount from about 88 to about 99.99 weight percent based on the total weight of the azeotropic or azeotrope-like composition, from about 95 weight percent to about 99.99 weight percent based on the weight of the azeotropic or azeotrope-like composition, or form about 99 weight percent to about 99.9 weight percent based on the weight of the azeotropic or azeotrope-like composition.

Azeotropic or azeotrope-like compositions of the present technology formed by combining HF and $PF_5$ in amounts as described above, and such compositions can have a boiling point of from about −13° C. to about 0° C. at a pressure of from about 268 psia to about 377 psia. In one example, an azeotropic or azeotrope-like composition including HF and $PF_5$ can have a boiling point of about −13° C. at a pressure of about 268 psia. In another example, an azeotropic or azeotrope-like composition including HF and $PF_5$ can have a boiling point of about −10° C. at a pressure of about 289 psia. In another example, an azeotropic or azeotrope-like composition including HF and $PF_5$ can have a boiling point of about −5° C. at a pressure of about 329 psia. In another example, an azeotropic or azeotrope-like composition including HF and $PF_5$ can have a boiling point of about 0° C. at a pressure of about 377 psia.

The formation of azeotropic or azeotrope-like compositions of the present technology can be conducted in various ways, and can be used for various purposes. In one example, an azeotropic or azeotrope-like composition HF and $PF_5$ can be formed during a $PF_5$ production process. Such an example can include reacting a phosphorous (P) feed stream and a fluorine ($F_2$) feed stream to yield a reaction product that includes $PF_5$, HF and by-products. The source of the $PF_5$ and the HF can be the reaction product. The $PF_5$ in the reaction product can result from the reaction of phosphorous in the phosphorous (P) feed stream and fluorine in the fluorine ($F_2$) feed stream. The HF in the reaction product can result in several ways, including but not limited to impurities in the fluorine ($F_2$) feed stream and reactions of the $PF_5$ with moisture that may be present. For example, $F_2$ is typically generated from HF, and a fluorine ($F_2$) feed stream can thus include some amount of HF, such as from about 0.1 weight percent to about 5 weight percent based upon the total weight of the fluorine ($F_2$) feed stream. In addition, if the $PF_5$ in the reaction product is exposed to moisture, it will react to form HF and $POF_3$. Accordingly, the by-products can include at least $POF_3$. An azeotropic or azeotrope-like composition HF and $PF_5$ can be formed by removing the by-products prior to combining the HF with the $PF_5$ to form the azeotropic or azeotrope-like composition.

In another example, $PF_5$ can be purified by using HF to separate the $PF_5$ from a composition containing $PF_5$ and at least one additional compound. The at least one additional compound can be, for example, an impurity. In such an example, the source of the $PF_5$ can be a composition containing $PF_5$ and at least one additional compound, and the HF can be provided in an amount sufficient to form an azeotropic or azeotrope-like composition of the $PF_5$ and the HF. After the $PF_5$ and the HF are combined to form the azeotropic or azeotrope-like composition, the method can include separating the azeotropic or azeotrope-like composition from the at least one additional compound.

In yet another example, a composition can be purified by utilizing $PF_5$ to remove HF from the composition. In such an example, the source of HF can be a composition comprising HF and at least one additional compound, and the $PF_5$ can be provided in an amount sufficient to form an azeotropic or azeotrope-like composition of the $PF_5$ and the HF. The at least one additional compound can be any compound, including but not limited to $POF_3$, LiF, $LiPF_6$, a compound miscible with $AsF_5$, or combinations thereof. After the $PF_5$ and the HF are combined to form the azeotropic or azeotrope-like composition, the method can include separating the azeotropic or azeotrope-like composition from the at least one additional compound. Separating the azeotropic or azeotrope-like composition from the at least one additional compound can be accomplished in any suitable manner, including for example distillation, flash separation, or other art recognized separating methods. In one example, the at least one additional compound does not form an azeotropic or azeotrope-like composition with $PF_5$, HF or a mixture of $PF_5$ and HF. In another example, the at least one additional compound does form an azeotropic or azeotrope-like composition with $PF_5$, HF or a mixture of $PF_5$ and HF.

Example 1

Azeotropic or azeotrope-like compositions of $PF_5$ and HF were formed by the following procedure.

A vapor liquid equilibrium (VLE) cell was constructed of stainless steel which was fitted with two vapor ports. One vapor port was connected to a pressure transducer that had been previously calibrated with a dead weight tester. The other port was used to evacuate and fill the VLE cell. Before being put into service, the VLE cell it was exposed to 19% $F_2$/81% $N_2$ at a pressure of about 30 psi and then evacuated to remove any organic impurities. The VLE cell was then completely evacuated. To start the procedure, 112.1 gm of degassed $PF_5$ was charged into the VLE cell. The VLE cell was immersed in a bath with a thermostat, which was maintained at temperature between −14 and 0° C. until equilibrium was achieved. The pressure was recorded when equilibrium was achieved and the VLE cell was removed from the bath and frozen in liquid nitrogen. An initial charge of HF was then added to the frozen VLE cell in an amount of 0.46 gm. The VLE cell was allowed to warm to the bath temperature and was then placed back in the bath with the thermostat. HF was incrementally added and the equilibrium pressure was recorded after each addition. Due to the relatively high pressure of $PF_5$, the mass of material in the vapor phase was not neglected. The mass of material in the vapor space was calculated from the known volume of the cell and the vapor density of $PF_5$. The overall liquid composition was then corrected by subtracting the mass of HF and $PF_5$ in the vapor space from the bulk amount added to the cell.

The experimental data is shown in FIG. 1. The scatter in the data at −13° C. is due to variations in the bath temperature at that condition during the testing. As can be seen from the experimental data, the pressures at −13° C. to 0° C. reach a maximum, indicating that an azeotrope was formed. The azeotrope-like region extends to at least 12 wt % HF.

Example 2

A composition of $LiPF_6$ crystals can be purified by using $PF_5$ to form an azeotropic or azeotrope-like composition with HF that adheres to the $LiPF_6$ crystals in the following manner.

$LiPF_6$ can be prepared by bubbling $PF_5$ through a solution of LiF dissolved in HF. Approximately half of the HF evaporates and the crystals can be filtered from the solution. Because the crystals have a small amount of HF adhering to them, $PF_5$ can be swept over the surface of the crystals. An azeotropic or azeotrope-like composition of HF and $PF_5$ forms and can be removed from the system. The resulting $LiPF_6$ crystals have a reduced HF content.

Example 3

The experimental data in Example 1 was used to regress the vapor liquid equilibrium of HF and $PF_5$ over a temperature range of −60 to 15° C. The azeotropic compositions at temperatures between −60 and 10° C. are given in Table 1.

TABLE 1

| Temp, ° C. | Press, psi | Azeotropic Composition | |
|---|---|---|---|
| | | HF, wt % | PF5, wt % |
| −60 | 51.2 | 0.2 | 99.8 |
| −40 | 112.8 | 0.3 | 99.7 |
| −20 | 216.2 | 0.35 | 99.65 |
| 0 | 377.1 | 0.45 | 99.55 |
| 10 | 486.3 | 0.5 | 99.5 |

Figure 2:
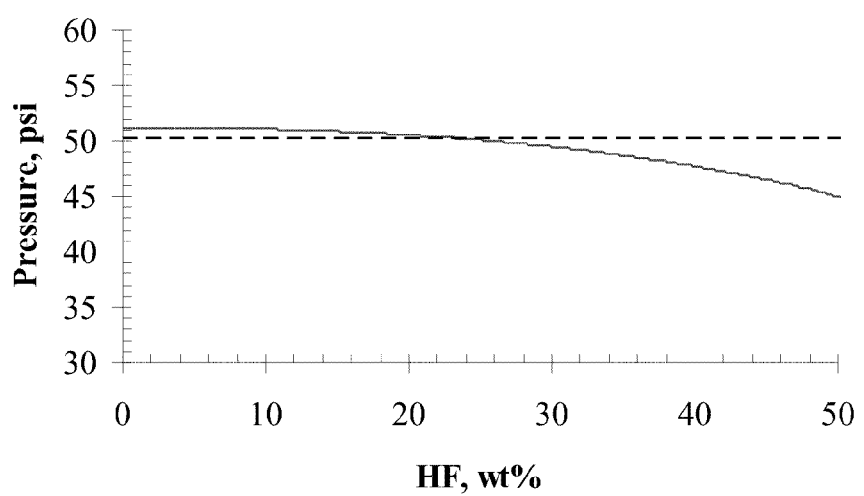
FIG. 2 displays the correlated vapor liquid equilibrium at −60° C.
Figure 3:
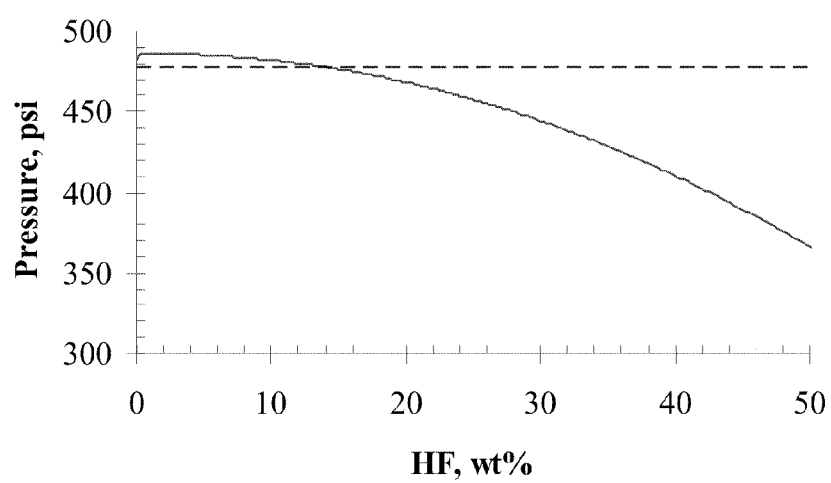
FIG. 3 displays the correlated vapor liquid equilibrium at 10° C.

The correlated vapor liquid equilibrium at −60 and 10° C. are shown in FIGS. 2 and 3. These correlations indicate that the bubble point curve remains relatively constant from over a large composition range, thus indicating the range of compositions that are azeotrope-like. As shown in FIG. 2, at −60° C. the bubble point pressure drops by less than about 2% for amounts of HF that are from 0 wt % to about 24 wt %. As shown in FIG. 3, at 10° C. the bubble point remains azeotrope-like by dropping by less than about 2% for amounts of HF from 0 wt % to about 15 wt %.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. An azeotropic or azeotrope-like composition comprising hydrogen fluoride and phosphorus pentafluoride, wherein the hydrogen fluoride is in an amount from about 0.01 weight percent to about 12 weight percent based on the total weight of the azeotropic or azeotrope-like composition, the phosphorus pentafluoride is in an amount from about 88 weight percent to about 99.99 weight percent based on the total weight of the azeotropic or azeotrope-like composition, and the azeotropic or azeotrope-like composition has a boiling point of from about −13° C. to about 0° C. at a pressure of from about 268 psia to about 377 psia.

2. The composition of claim 1, wherein the hydrogen fluoride is present in the amount from about 0.01 to about 5 weight percent based on the total weight of the azeotropic or azeotrope-like composition.

3. The composition of claim 2, wherein the hydrogen fluoride is present in the amount from about 0.01 to about 1 weight percent based on the total weight of the azeotropic or azeotrope-like composition.

4. An azeotropic or azeotrope-like composition consisting essentially of hydrogen fluoride and phosphorus pentafluoride, wherein the hydrogen fluoride is in an amount from about 0.01 weight percent to about 12 weight percent based on the total weight of the azeotropic or azeotrope-like composition, the phosphorus pentafluoride is in an amount from about 88 weight percent to about 99.99 weight percent based on the total weight of the azeotropic or azeotrope-like composition, and the azeotropic or azeotrope-like composition has a boiling point of from about −13° C. to about 0° C. at a pressure of from about 268 psia to about 377 psia.

5. The composition of claim 4, wherein the hydrogen fluoride is present in the amount from about 0.01 to about 5 weight percent based on the total weight of the azeotropic or azeotrope-like composition.

6. The composition of claim 5, wherein the hydrogen fluoride is present in the amount from about 0.01 to about 1 weight percent based on the total weight of the azeotropic or azeotrope-like composition.

\* \* \* \* \*